No. 772,397. PATENTED OCT. 18, 1904.
J. W. BARNHILL.
GATE.
APPLICATION FILED JULY 7, 1904.
NO MODEL.
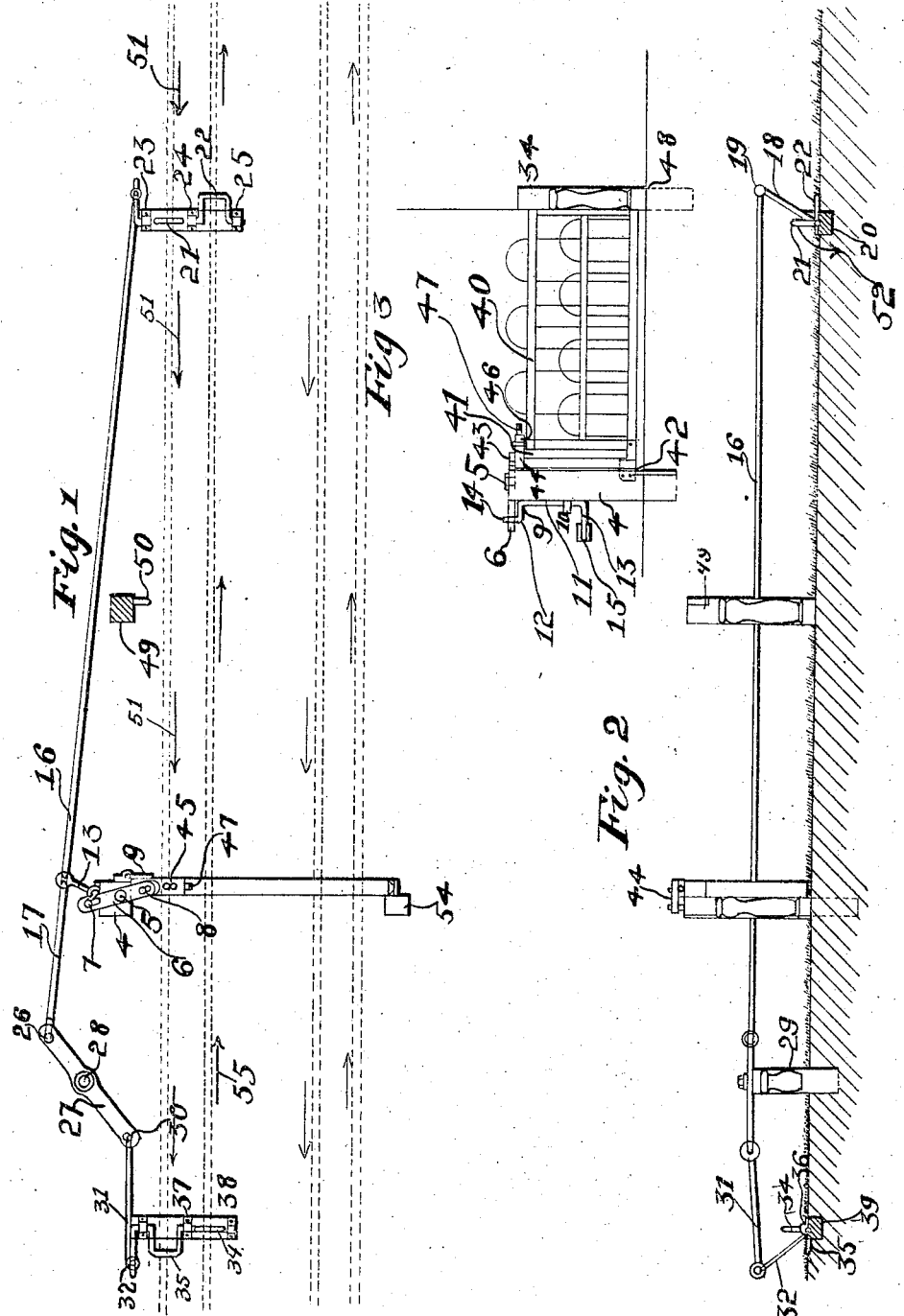
Witnesses:
Max Schwinger
R. W. Pittman
Inventor:
J. W. Barnhill.
By his Attorney
F. A. Richards.

No. 772,397.

Patented October 18, 1904.

UNITED STATES PATENT OFFICE.

JAMES W. BARNHILL, OF BEARD, KENTUCKY.

GATE.

SPECIFICATION forming part of Letters Patent No. 772,397, dated October 18, 1904.

Application filed July 7, 1904. Serial No. 215,565. (No model.)

*To all whom it may concern:*

Be it known that I, JAMES W. BARNHILL, a citizen of the United States, residing in Beard, in the county of Oldham and State of Kentucky, have invented certain new and useful Improvements in Gates, of which the following is a specification.

This invention has reference to gates, and especially to those employed along driveways.

It is an object of the invention to provide a construction whereby a gate may be readily opened automatically when a vehicle approaches it and which can be likewise closed by the vehicle after passing through; also, to automatically hold and release the gate in its open and closed position, and, further, provide against the sagging to which usage subjects the gate. These objects are preferably obtained by a movable frame which is operated by a series of levers, so that it may be tilted in opposite directions in a plane parallel to the disposition of a fence, whereby a gate carried thereby may also be tilted in one direction or another, and thus be swayed to an open or closed position at will, and this tilting operation is effected through the instrumentality of a train of mechanism which is adapted to be operated upon by the wheels of a vehicle.

Illustrating this invention reference is had to the accompanying drawings, whereon—

Figure 1 illustrates a plan view of the embodiment of the invention. Fig. 2 is an end elevation of the same, and Fig. 3 illustrates the connecting and contiguous portions.

Similar characters of reference indicate like parts throughout the figures.

To a post 4 may be pivoted by means of a stud 5 a lever 6, which in the present instance is provided with slots 7 and 8, respectively. Suitably journaled on said post 4, as at 9 and 10, respectively, is a rod 11, provided at its upper end with a crank 12 and at its lower end with an arm 13, an upward-extending portion 14 of said crank 12 passing into said slot 7 of the lever 6. Suitably linked to a head 15 on the arm 13 are rods 16 and 17, respectively, the former of which runs for a considerable distance to a point remote from the gate, where it is connected with an arm 18 by a suitable connection 19, and this arm 18 also connected with a member preferably mounted on a sill 20, suitably embedded or otherwise located in the road-bed. This member 20 in the present instance may comprise two extensions 21 and 22, respectively, which are located substantially at right angles to the other and are mounted in bearings 23, 24, and 25, carried by the sill 20.

The rod 17 is suitably connected, as at 26, to a lever 27, pivoted at 28 to a post 29, also somewhat remote from the gate, and to its end beyond said lever 27 is likewise coupled a rod 31, suitably pivoted at 32 to an arm 33, connected to a structure similar to that described at the end of rod 16 and which also comprises two extensions 34 and 35, mounted in bearings 36, 37, and 38, carried by a sill 39, which extensions are likewise substantially at right angles to each other, as seen, for instance in Fig. 2.

The gate 40, which may be of any construction desired, may be suitably mounted in a frame 41, which is hinged to the post 4 at 42, and provided with a stud 43, adapted to take in the slot 8 of the lever 6.

For preventing the gate from sagging I provide an upper arm 44 of the member 41 with a slot 45, in which may take a stud 46, carried by the stile of the gate, and into this arm 44 I direct the adjustment-screw 47, the end of which takes against the stud or pin 46 of the gate, and in this way the free end 48 of said gate may be adjusted to any proper height to prevent it from sagging along the ground.

For the purpose of holding the gate in an open position I provide a post 49, which may be provided with a catch 50, so as to hold the gate in an open position when the operating mechanism is manipulated.

It will now be observed by reference to Fig. 1 that the extension 21 is in an elevated position, while the extension 22 lies substantially parallel with the ground. A carriage proceeding along the road in the direction of the arrows 51 will pass over said extension 21 and cause it to move in the direction of the arrow 52, Fig. 2, so that it may lie down on the ground in a position opposite to that of the extension 22, Fig. 2, whereupon the arm 18 will move to a position opposite to that shown in Fig. 2 and cause the push to be transmitted through rods 16 and 17 to the lever 27, pivoted at 28 to the post 29, which will in turn draw on the rod 31, causing the movement of the arm 32 and likewise tilting the extension 34 down upon the ground. At the same time the arm 13, which is connected to the rod 16, will have been shifted around, which will tilt the frame 41 and cause the gate 40 to swing out against the post 49. The vehicle may then proceed over the extension 35, which has in the meantime been shifted to an elevated position, and this extension may be again lowered by the wheels of the vehicle, which will again cause the arm 32, rods 31, 17, and 16, respectively, and the various other mechanisms to operate, which will in turn close the gate against the post 54, and in case a vehicle moves along the road in the direction of the arrow 55 the operation heretofore mentioned is obviously duplicated in the reverse. Thus it will be seen that in approaching with a vehicle a gate may be swung by the vehicle and will open and close automatically. It will be further noted that by tilting the gate in one direction or another to cause it to sway to and fro through the instrumentality of a tilting member to which said gate is connected the accidental disengagement of the gate from its bearings is improbable. Furthermore, the tilting member, together with the operating mechanism for the same, may be manufactured independent of the fence and gate structure, which is a desideratum. It is also to be noted that by carrying the gate by a tilting frame and connecting the tilting mechanism to the frame the liability of distorting the stile of the gate is lessened, hence rendering the gate structure more efficient and durable. It will be further observed that the tilting of the gate causes a displacement of the center of gravity thereof, which causes the gate to open and close.

Variations may be resorted to within the purview of this invention.

Having thus described my invention, I claim—

1. In an apparatus for operating gates, the combination with a gate, of a frame in which said gate is swung, a post and a lever pivoted to said post and connected with said frame, a crank-arm connected to said lever, a secondary lever pivoted to another post, rods proceeding from said levers, and means operable by the wheels of a vehicle for actuating said levers and gate.

2. In an apparatus for operating gates, the combination with a gate, of a frame in which said gate is swung, a post and a lever pivoted to said post and connected with said frame, a crank-arm connected to said lever, a secondary lever pivoted to another post, rods proceeding from said levers, and members located a suitable distance from said gate on opposite sides, and which comprise oppositely-disposed extensions, one of which is adapted to rest on the ground while the other is elevated, and which when either elevated extension is caused to fall, will so operate the train of mechanism as to either open or close the gate.

3. In an apparatus for operating gates, the combination with a swing-gate, a frame in which said gate is swung, a lever pivoted to the post and operatively connected with said frame, a crank-arm carried by said post and connected with said lever, a secondary lever pivoted to a post, and connected to a crank-arm, a trip located on one side of said gate, a rod connection between said trip and the pivoted lever, and another trip located on the opposite sides of the gate.

JAMES W. BARNHILL.

Witnesses:
FRED W. BARNACK,
S. E. WILSON.